US010063555B2

(12) United States Patent
Zou et al.

(10) Patent No.: US 10,063,555 B2
(45) Date of Patent: Aug. 28, 2018

(54) METHOD, APPARATUS, AND SYSTEM FOR ACHIEVING PRIVILEGE SEPARATION

(71) Applicant: TENCENT TECHNOLOGY (SHENZHEN) COMPANY LIMITED, Shenzhen (CN)

(72) Inventors: Yi Zou, Shenzhen (CN); Lei Gao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 232 days.

(21) Appl. No.: 15/004,883

(22) Filed: Jan. 22, 2016

(65) Prior Publication Data
US 2016/0142414 A1 May 19, 2016

Related U.S. Application Data

(63) Continuation of application No. PCT/CN2014/082972, filed on Jul. 25, 2014.

(30) Foreign Application Priority Data

Jul. 25, 2013 (CN) .......................... 2013 1 0317848

(51) Int. Cl.
G06F 15/16 (2006.01)
H04L 29/06 (2006.01)
H04L 12/18 (2006.01)

(52) U.S. Cl.
CPC .......... *H04L 63/10* (2013.01); *H04L 12/1822* (2013.01); *H04L 63/104* (2013.01); *H04L 63/105* (2013.01)

(58) Field of Classification Search
CPC ....... H04L 63/08; H04L 63/102; H04L 63/10; G06F 21/6218

(Continued)

(56) References Cited

U.S. PATENT DOCUMENTS

2003/0126245 A1* 7/2003 Feltin .................... G06Q 30/08
709/223
2006/0218406 A1* 9/2006 Kinoshita ............... G06F 21/31
713/182
(Continued)

FOREIGN PATENT DOCUMENTS

CN 101136872 A 3/2008
CN 101198993 A 6/2008
(Continued)

OTHER PUBLICATIONS

The World Intellectual Property Organization (WIPO) International Search Report for PCT/CN2014/082972, dated Nov. 26, 2014.
(Continued)

*Primary Examiner* — Evans Desrosiers
(74) *Attorney, Agent, or Firm* — Anova Law Group, PLLC

(57) ABSTRACT

Methods, apparatus, and systems for achieving privilege separation are provided herein. In an exemplary method, an operation-applying instruction sent by a first-type client can be received. According to the operation-applying instruction, it can be determined whether an operation corresponding to the operation-applying instruction is able to be executed. When the operation corresponding to the operation-applying instruction is able to be executed, an operation-executing instruction can be sent to a second-type client, such that the second-type client can obtain a privilege for executing the operation, according to the operation-executing instruction. A notifying instruction can be sent to a third-type client, such that the third-type client can obtain a notification that the second-type client has obtained the privilege for executing the operation.

12 Claims, 11 Drawing Sheets

(58) Field of Classification Search
 USPC .............................................................. 726/4
 See application file for complete search history.

(56) References Cited

U.S. PATENT DOCUMENTS

2009/0216894 A1* 8/2009 Sagara .................... H04L 51/14
 709/230
2014/0359735 A1* 12/2014 Lehmann ............ H04L 63/0884
 726/7

FOREIGN PATENT DOCUMENTS

| CN | 101583953 A | 11/2009 |
| CN | 101753967 A | 6/2010 |
| CN | 102033876 A | 4/2011 |
| CN | 102316084 A | 1/2012 |
| CN | 103401703 A | 11/2013 |

OTHER PUBLICATIONS

The State Intellectual Property Office of the People's Republic of China (SIPO) Office Action 1 for 201310317848.2, dated Feb. 27, 2015 7 Pages (including translation).

* cited by examiner

METHOD, APPARATUS, AND SYSTEM FOR ACHIEVING PRIVILEGE SEPARATION

CROSS-REFERENCES TO RELATED APPLICATIONS

This application is a continuation application of PCT Patent Application No. PCT/CN2014/082972, filed on Jul. 25, 2014, which claims priority to Chinese Patent Application No. 201310317848.2, filed on Jul. 25, 2013, the entire content of both of which is incorporated herein by reference.

FIELD OF THE DISCLOSURE

The present disclosure generally relates to the field of Internet technology and, more particularly, relates to methods, apparatus, and systems for achieving privilege separation.

BACKGROUND

Currently, users use the Internet for entertainment in more and more ways, such as using real-time voice communication software for voice communication. Real-time voice communication software can provide a function for launching a live broadcast in an audio-and-video live broadcast room.

Conventionally, an administrator user of an audio-and-video live broadcast room has a privilege for launching a live broadcast, when a specific user needs to launch a live broadcast, the administrator user needs to temporarily transfer the administrator-user privilege to the specific user, such that specific user can launch the live broadcast. However, the administrator-user privilege also includes other privileges, such as performing an operation of maintaining order for the audio-and-video live broadcast room. Temporarily granting the administrator-user privilege to the specific user in order to launch the live broadcast is a complicated operation. In addition, because the administrator-user privilege is transferred, security of the audio-and-video live broadcast room can be weakened.

BRIEF SUMMARY OF THE DISCLOSURE

One aspect of the present disclosure includes methods for achieving privilege separation. In an exemplary method, an operation-applying instruction sent by a first-type client can be received. According to the operation-applying instruction, it can be determined whether an operation corresponding to the operation-applying instruction is able to be executed. When the operation corresponding to the operation-applying instruction is able to be executed, an operation-executing instruction can be sent to a second-type client, such that the second-type client can obtain a privilege for executing the operation, according to the operation-executing instruction. A notifying instruction can be sent to a third-type client, such that the third-type client can obtain a notification that the second-type client has obtained the privilege for executing the operation.

Another aspect of the present disclosure includes methods for achieving privilege separation. In an exemplary method, a first-type client can send an operation-applying instruction to a server, to cause the server to determine whether an operation corresponding to the operation-applying instruction is able to be executed according to the operation-applying instruction. When the operation corresponding to the operation-applying instruction is able to be executed, a second-type client can receive an operation-executing instruction sent by the server. The second-type client can obtain a privilege for executing the operation according to the operation-executing instruction. A third-type client can receive a notifying instruction sent by the server. The third-type client can obtain a notification that the second-type client has obtained the privilege for executing the operation.

Another aspect of the present disclosure includes systems for achieving privilege separation. The system can include a server. The server can be coupled with a client. The client can include a first-type client, a second-type client, and a third-type client. The first-type client can be configured to send an operation-applying instruction to the server. The second-type client can be configured to, when an operation corresponding to the operation-applying instruction is able to be executed, receive an operation-executing instruction sent by the server, and obtain a privilege for executing the operation according to the operation-executing instruction. The third-type client can be configured to receive a notifying instruction sent by the server, and obtain a notification that the second-type client has obtained the privilege for executing the operation.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the disclosure.

DETAILED DESCRIPTION

Figure 1:
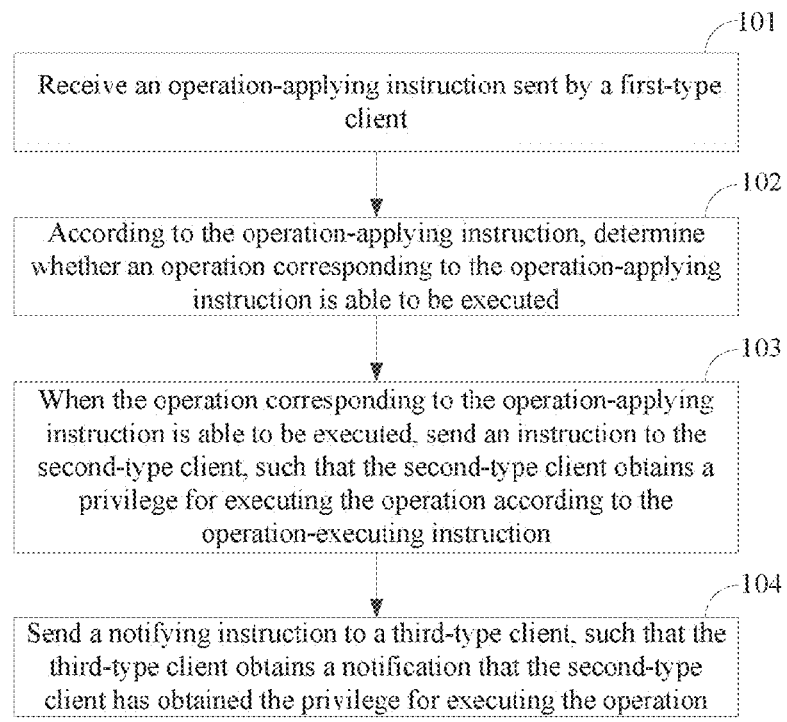
FIG. 1 depicts a flow diagram of an exemplary method for achieving privilege separation in accordance with various disclosed embodiments.

Reference will now be made in detail to exemplary embodiments of the disclosure, which are illustrated in the accompanying drawings. Wherever possible, the same reference numbers will be used throughout the drawings to refer to the same or like parts.

Various embodiments provide methods for achieving privilege separation. The disclosed methods can be used for solving various problems. One of the various problems is the potential weakening of security of an audio-and-video live broadcast room when an administrator-user privilege is temporarily transferred to a specific user in order to implement a specific function for the audio-and-video live broadcast room.

In an exemplary method, an operation-applying instruction sent by a first-type client can be received. The first-type client can be an administrator-user client. That is, the first-type client can correspond to, be operated by, or represent an administrator user. The first-type client can request a specific operation. The first-type client can send an operation-applying instruction in order to request the specific operation. When the operation is able to be executed, the server can send an operation-executing instruction to a second-type client. The second-type client can be a specific-user client. That is, the second-type client can correspond to, be operated by, or represent a specific user. Thus, the specific-user client can obtain a privilege for executing the operation, e.g., a privilege for launching a live broadcast. The server can send to other clients, including a third-type client, a notification that the second-type client has obtained the privilege for executing the operation. Thus, the separating of a privilege for executing a specific operation from an administrator privilege can be achieved. The administrator privilege does not need to be transferred to another user. Security of an audio-and-video live broadcast room can be ensured.

In various embodiments, the method for achieving privilege separation can be implemented on an apparatus for achieving privilege separation. The apparatus for achieving privilege separation can be integrated in a server for achieving privilege separation.

As used herein, wherever applicable, 'broadcast' and 'live broadcast' can be used interchangeably. 'Performing an operation' and 'executing an operation' can be used interchangeably. 'Launching a broadcast' can refer to starting, turning on, or running the broadcast. 'Ending a broadcast' can refer to turning off the broadcast.

A room can refer to any appropriate form of synchronous conferencing, occasionally even asynchronous conferencing. The technology and purpose of information-sharing in a room can be, but is not limited to, real-time online chat and online interaction between users, audio or video sharing, presentation, and any other appropriate interactions. Depending on the technology and purpose of information-sharing, the room can be, e.g., voice room, chat room, audio-and-video live broadcast room, or any other appropriate rooms. Although audio-and-video live broadcast room is depicted in certain embodiments for illustrative purposes, the disclosed method, apparatus, device and system can be applicable to any appropriate room, without limitation.

FIG. 1 depicts a flow diagram of an exemplary method for achieving privilege separation in accordance with various disclosed embodiments. As shown in FIG. 1, the method can include the following exemplary steps.

In Step 101, an operation-applying instruction sent by a first-type client is received. The server can receive the operation-applying instruction sent by the first-type client. The first-type client can be an administrator-user client. The administrator-user client can initiate an application or a request for executing a specific operation. The application or request for executing the specific operation can also be referred to as an operation-applying instruction. For example, in an audio-and-video live broadcast room, the administrator-user client can send to the server an operation-applying instruction containing broadcast-launching operation information or broadcast-ending operation information, i.e., an application or request for executing a broadcast-launching operation or a broadcast-ending operation. As used herein, a broadcast-launching operation can also be referred to as a broadcast operation.

In certain embodiments, the operation-applying instruction can contain a second-type client identification and operation-type information. The second-type client identification can be used for identifying the second-type client. The operation-type information may include, e.g., the broadcast-launching operation information, the broadcast-ending operation information, or any other appropriate information. The second-type client can be a specific-user client. In various embodiments, by sending the operation-applying instruction, the administrator-user client can apply for sending, to the specific user, a privilege for executing the specific operation.

For example, in an audio-and-video live broadcast room, a specific user can be a user having an "artist" status. That is, a live broadcast can be launched or ended by a user with the "artist" status, to provide video live broadcast for general users in the audio-and-video live broadcast room.

In Step 102, according to the operation-applying instruction, it is determined whether an operation corresponding to the operation-applying instruction is able to be executed. In various embodiments, whether the operation is able to be executed refers to whether it is possible to execute the operation. i.e., whether the operation is able to be executed, or whether the operation is allowed to be executed. According to the operation-applying instruction, the server can determine whether an operation corresponding to the operation-applying instruction is able to be executed, e.g., whether the operation corresponding to the operation-applying instruction is being performed by another user at the current time.

In Step 103, when the operation corresponding to the operation-applying instruction is able to be executed, an operation-executing instruction is sent to the second-type client, such that the second-type client obtains a privilege for executing the operation according to the operation-executing instruction.

For example, the second-type client can be a user client having the "artist" status. The operation corresponding to the operation-applying instruction can be a broadcast-launching operation. In this case, via the received operation-executing instruction, the second-type client can obtain a privilege for the broadcast-launching operation. The second-type client can execute the broadcast-launching operation or refuse to execute the broadcast-launching operation.

In Step 104, a notifying instruction is sent to a third-type client, such that the third-type client obtains a notification that the second-type client has obtained the privilege for executing the operation. The third client can be a general-user client. That is, the third-type client can correspond to, be operated by, or represent a general user. A general user can be any other user other than the administrator user and the specific user. At the same time of sending the operation-executing instruction to the second-type client by the server, the server can send the notifying instruction to the third-type client to notify the third-type client that the second-type client has obtained the privilege for executing the operation. Thus, the third-type client can wait for the second-type client to execute the specific operation. For example, in an audio-and-video live broadcast room, a general user can obtain a notification that a specific user (e.g., a user having the "artist" status) is to execute a broadcast-launching operation.

In the method according to various embodiments, a first-type client, i.e., an administrator-user client, can send an operation-applying instruction to a server, such that the server can send an operation-executing instruction to a second-type client, i.e., a specific-user client. Thus, the second-type client can obtain a privilege for executing an operation, e.g., a privilege for a broadcast-launching operation. In the process as disclosed above, only the privilege for executing the specific operation needs to be granted to a specific user, while the administrator-user privilege is not transferred. Thus, security of an audio-and-video live broadcast room can be ensured.

In certain embodiments, a method for achieving privilege separation can further include the following step(s). When the operation corresponding to the operation-applying instruction is not able to be executed, an application-failure notification can be sent to the first-type client.

Figure 2:
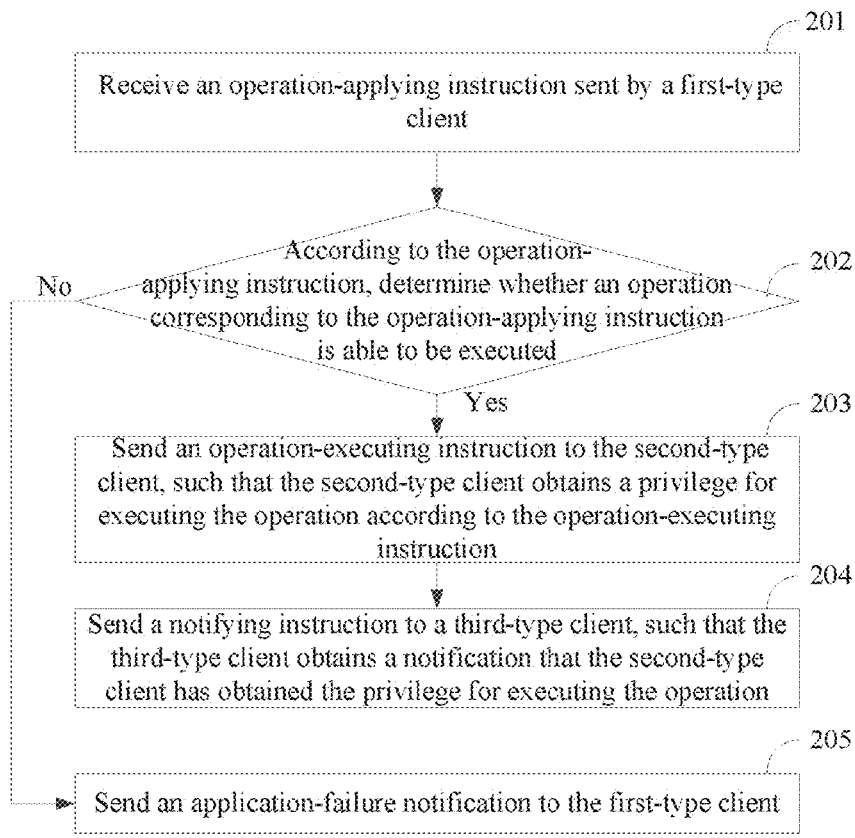
FIG. 2 depicts a flow diagram of another exemplary method for achieving privilege separation in accordance with various disclosed embodiments.

FIG. 2 depicts a flow diagram of another exemplary method for achieving privilege separation in accordance with various disclosed embodiments. Referring to FIG. 2, the method for achieving privilege separation can further include the following exemplary step(s).

In Step 201, an operation-applying instruction sent by a first-type client is received. In Step 202, according to the operation-applying instruction, it is determined whether an operation corresponding to the operation-applying instruction is able to be executed. When the operation corresponding to the operation-applying instruction is able to be executed, Step 203 can be performed. When the operation corresponding to the operation-applying instruction is not able to be executed, Step 205 can be performed.

In Step 203, an operation-executing instruction is sent to a second-type client, such that the second-type client obtains a privilege for executing the operation according to the operation-executing instruction. In Step 204, a notifying instruction is sent to a third-type client, such that the third-type client obtains a notification that the second-type client has obtained the privilege for executing the operation. In Step 205, an application-failure notification is sent to the first-type client.

In the embodiment as described above, the disclosed method can further include sending an application-failure notification to the first-type client when the operation corresponding to the operation-applying instruction is not able to be executed. For example, the operation corresponding to the operation-applying instruction is being performed by another user at the current time, and in this case, the first-type client can be notified that the application has failed. In addition, the first-type client can be notified of reason(s) of the application failure.

Based on the above-described embodiments, in certain embodiments, a method for achieving privilege separation can further include the following step(s). A room-entering request sent by a client can be received. According to the room-entering request, a client type corresponding to the client can be determined. The room the client requests to enter by sending the room-entering request can have one or more clients. A client-type notification can be sent to some or all of the one or more clients in the room. Thus, in one embodiment, all of the clients in the room can obtain the client type of the client that sends the room-entering request. The client type can include, e.g., a first-type client, a second-type client, a third-type client, and/or any other appropriate type. In certain embodiments, the client type of a client can be one of a first-type client, a second-type client, or a third-type client.

In various embodiments, the client type of the client that sends the room-entering request can be one of the first-type client, the second-type client, and the third-type client. Thus, as used herein, the first-type client, the second-type client, or the third-type client can refer to a client, unless it is specified that the first-type client, the second-type client, or the third-type client refer to the client type of a client.

That is, when a client applies for entering a voice room, the client can send a room-entering request to the server. The room-entering request can contain a user identification, e.g., a user ID. The user identification can be used for identifying the client. According to the room-entering request, the server can look up and find a client type corresponding to the room-entering request. Via means such as broadcasting, the server can notify all the clients in the voice room of the client type of the client that has just entered the voice room. The client that sends the room-entering request can obtain his/her own client type via the same means. The client type can include, e.g., a first-type client (i.e., an administrator-user client), a second-type client (i.e., a specific-user client), a third-type client (i.e., a general-user client), or any other appropriate type.

In certain embodiments, after the room-entering request sent by a client is received, the method for achieving privilege separation can further include the following step (s). An entering-success message can be sent to the client that sends the room-entering request. In this case, the client has successfully entered the room after sending the room-entering request, and an entering-success message can be sent to the client to notify the client that the client has successfully entered the room. A member-list-pulling request sent by the client that sends the room-entering request can be received. A member-list message can be sent to the client that sends the room-entering request. The member-list message can contain the client type(s) of one of, some of, or all of the clients in the room.

In other words, after a client enters the voice room, the client can first obtain his/her own client type. Next, the client can pull the member-list message of other user(s) in the room, and thus can obtain the client type of all the clients in the room. When a client enters the room afterwards, the member-list message can be updated via means such as receiving a broadcast notification. For example, by broadcasting, the server can notify the clients in the voice room of the client type of the client that has just entered the voice room. At the same time, the server can update the member-list message using the client type of the client that has just entered the voice room.

Figure 3:
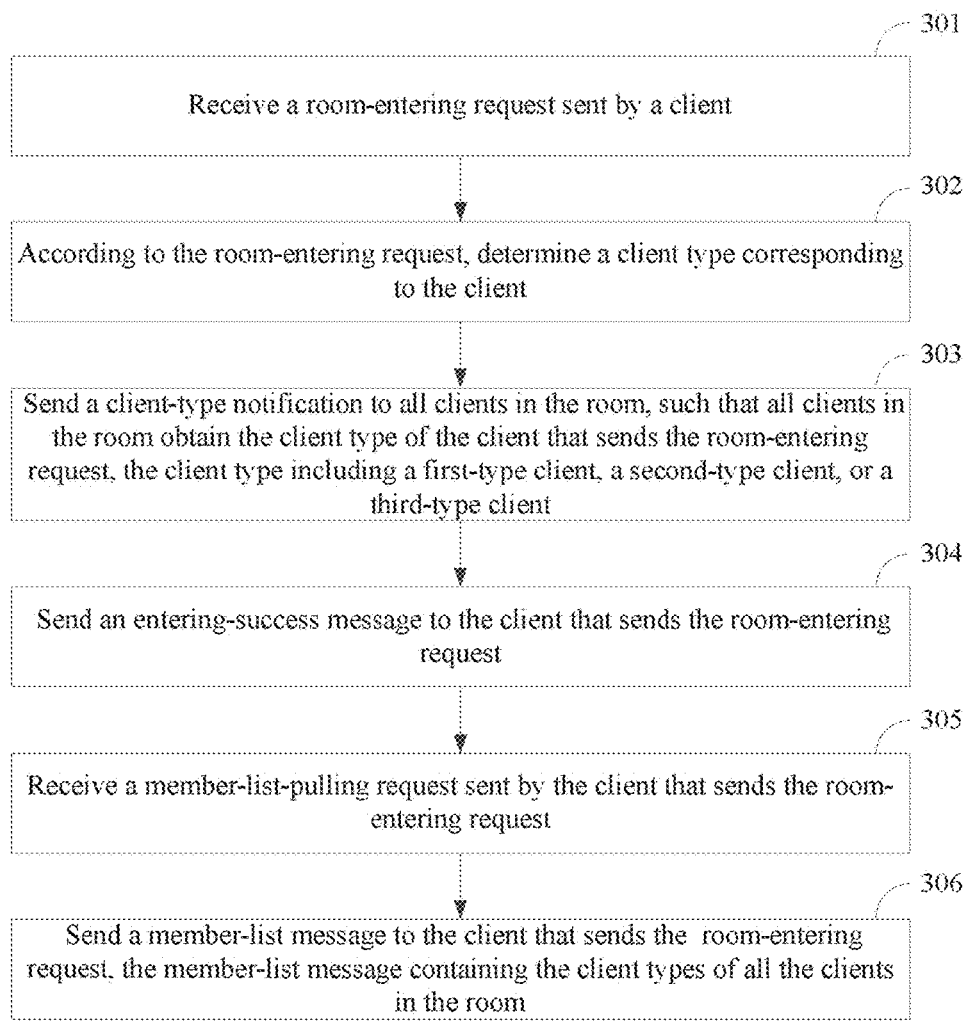
FIG. 3 depicts a flow diagram of another exemplary method for achieving privilege separation in accordance with various disclosed embodiments.

FIG. 3 depicts a flow diagram of another exemplary method for achieving privilege separation in accordance with various disclosed embodiments. Referring to FIG. 3, the method for achieving privilege separation can further include the following exemplary step(s).

In Step 301, a room-entering request sent by a client is received. In Step 302, according to the room-entering request, a client type corresponding to the room-entering request, i.e., a client type of the client that sends the room-entering request, is determined.

In Step 303, a client-type notification is sent to all clients in the room, such that all clients in the room can obtain the client type of the client that sends the room-entering request. The client type can include, e.g., a first-type client, a second-type client, a third-type client, or any other appropriate type.

In Step 304, an entering-success message is sent to the client that sends the room-entering request. In Step 305, a member-list-pulling request sent by the client that sends the room-entering request is received. In Step 306, a member-list message is sent to the client that sends the room-entering request. The member-list message can contain the client type(s) of all the clients in the room.

In the method as disclosed above, e.g., Steps 301-306, a process of a client entering a room is provided. After the process, a first-type client can perform subsequent steps including sending an operation-applying instruction to the server. The server can perform subsequent steps including receiving the operation-applying instruction sent by the first-type client. It is to be noted that, in one embodiment, Step 304 can be performed after Step 301. Sending the entering-success message to the client is performed after the room-entering request sent by the client is received, without further limitation.

Compared with various disclosed embodiments (e.g., as shown in FIG. 1), the method disclosed above (e.g., as shown in FIG. 3) can further include a process of a client entering a room and obtaining client types. Clients can be divided into a first-type client, a second-type client, a third-type client, such that a privilege for a specific operation can be separated.

Based on the above-described embodiments, in certain embodiments, when a received operation-applying instruction contains broadcast-launching operation information, during the sending of an operation-executing instruction to a second-type client such that the second-type client can obtain a privilege for executing the operation according to the operation-executing instruction, the method can include the following step(s). That is, an instruction for executing a broadcast-launching operation can be sent to the second-type client, such that the second-type client can obtain the privilege for the broadcast-launching operation according to the instruction for executing the broadcast-launching operation.

When a received operation-applying instruction contains broadcast-ending operation information, during the sending of an operation-executing instruction to a second-type client such that the second-type client can obtain a privilege for executing the operation according to the operation-executing instruction, the method can include the following step(s). That is, a broadcast-ending-operation notification can be sent to the second-type client. Further, a privilege for executing the operation can be terminated for the second-type client.

The terminating of the privilege for executing the operation can be implemented in any appropriate way, without limitation. In one embodiment, the privilege for executing the operation can be terminated by the second-type client. For example, the broadcast-ending-operation notification sent by the server can contain appropriate instructions such that the second-type client can terminate its own privilege for executing the operation.

In another embodiment, the privilege for executing the operation can be terminated for the second-type client by the server. For example, the server can configure the settings of the room such that the second-type client no longer has the privilege for executing the operation. The server can send the broadcast-ending-operation notification to the second-type client to notify the second-type client that the privilege for executing the operation has been terminated.

In yet another embodiment, the server can configure the settings of the room such that the second-type client no longer has the privilege for executing the operation. In addition, the server can send the broadcast-ending-operation notification to the second-type client to notify the second-type client that the privilege for executing the operation has been terminated. In this case, according to the instructions in the broadcast-ending-operation notification sent by the server, the second-type client may optionally perform certain appropriate steps in order to complete the terminating of the privilege for executing the operation.

In other words, for example, when the operation-type information contains the broadcast-launching operation information or the broadcast-ending operation information, the server can send an instruction for executing a broadcast-launching operation or a broadcast-ending-operation notification to the second-type client, according to the operation-applying instruction. After the second-type client receives the instruction for executing a broadcast-launching operation, the second-type client can obtain a privilege for the broadcast-launching operation. The second-type client can choose to launch a broadcast, or choose to refuse to launch the broadcast. After the second-type client receives the broadcast-ending-operation notification, the privilege for executing the operation can directly be terminated for the second-type client, and the second-type client can no longer execute the broadcast operation.

Figure 4:
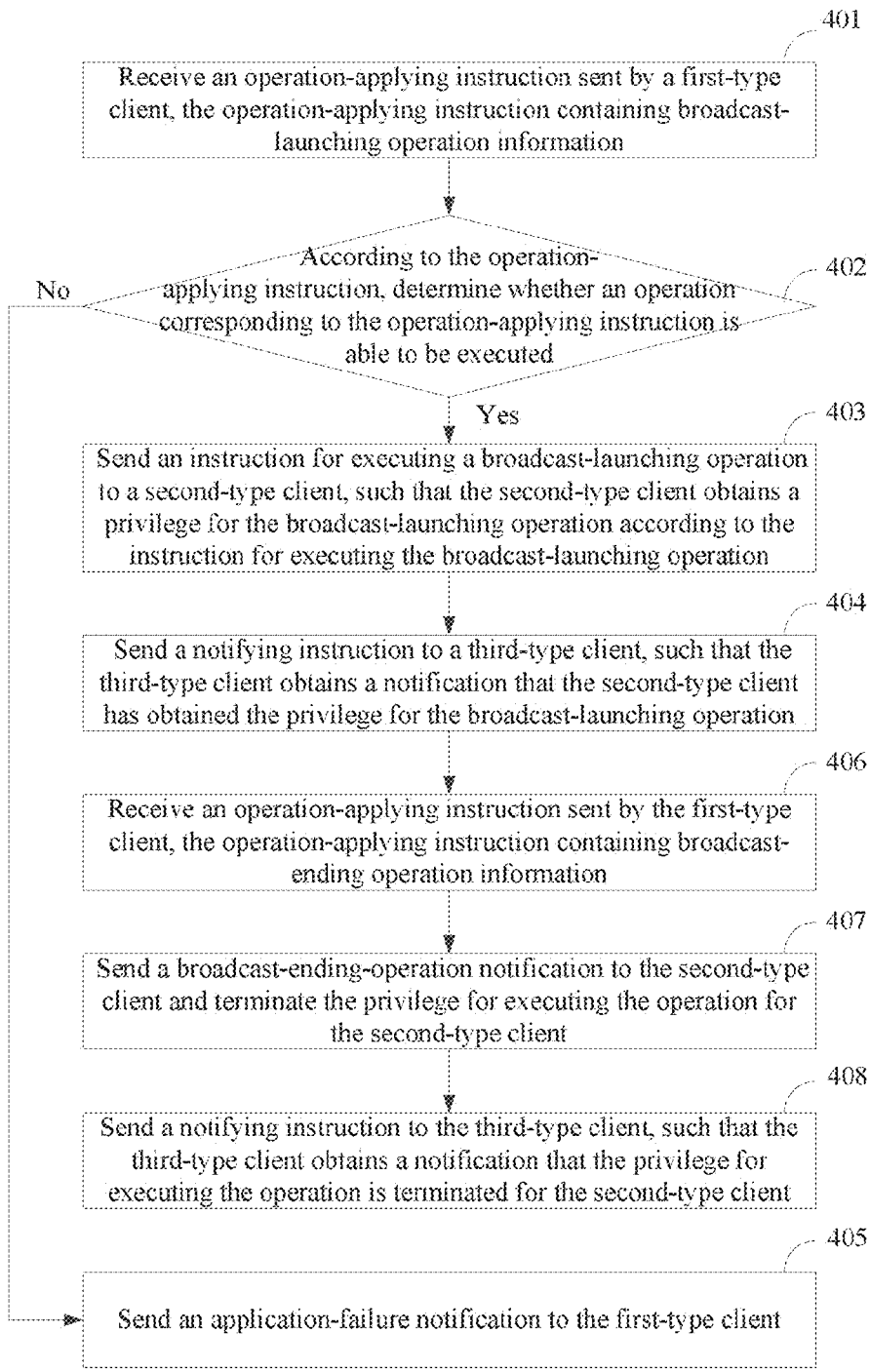
FIG. 4 depicts a flow diagram of another exemplary method for achieving privilege separation in accordance with various disclosed embodiments.

FIG. 4 depicts a flow diagram of another exemplary method for achieving privilege separation in accordance with various disclosed embodiments. Referring to FIG. 4, the method for achieving privilege separation can further include the following exemplary step(s).

In Step 401, an operation-applying instruction sent by a first-type client is received. The operation-applying instruction can contain broadcast-launching operation information.

In Step 402, according to the operation-applying instruction, it is determined whether an operation corresponding to the operation-applying instruction is able to be executed. When the operation corresponding to the operation-applying instruction is able to be executed, Step 403 can be performed. When the operation corresponding to the operation-applying instruction is not able to be executed, Step 405 can be performed.

In Step 403, an instruction for executing a broadcast-launching operation is sent to a second-type client, such that the second-type client can obtain a privilege for the broadcast-launching operation according to the instruction for executing the broadcast-launching operation. In Step 404, a notifying instruction is sent to a third-type client, such that the third-type client obtains a notification that the second-type client has obtained the privilege for the broadcast-launching operation. In Step 405, an application-failure notification is sent to the first-type client.

In Step 406, an operation-applying instruction sent by the first-type client is received. The operation-applying instruction can contain broadcast-ending operation information.

In Step 407, a broadcast-ending-operation notification is sent to the second-type client, and the privilege for executing the operation is terminated for the second-type client. In Step 408, a notifying instruction is sent to a third-type client, such that the third-type client obtains a notification that the privilege for executing the operation is terminated for the second-type client.

In various embodiments described above, for illustrative purposes, the disclosed method can be implemented in an audio-and-video live broadcast room. A first-type client, i.e., an administrator-user client, can send an operation-applying instruction containing broadcast-launching operation information, or broadcast-ending operation information. The operation-applying instruction containing the broadcast-launching operation information can be referred to as the first operation-applying instruction. The operation-applying instruction containing the broadcast-ending operation information can be referred to as the second operation-applying instruction.

Thus, a second-type client, i.e., a specific-user client, can obtain a privilege for a broadcast-launching operation or terminate the privilege for the broadcast-launching operation. Thus, the separating of a privilege for executing a specific operation from an administrator-user privilege can be achieved. When a specific user needs to launch a broadcast, the administrator user does not need to transfer his/her own administrator-user privilege to another user (i.e., the specific user). By simply sending the operation-applying instruction to the server, the specific user can obtain the privilege for the broadcast-launching operation. Thus, security of an audio-and-video live broadcast room can be ensured.

In various embodiments, the disclosed method can be implemented on a client for achieving privilege separation. The client can be loaded on a terminal. For example, the terminal can include a smart phone, a tablet computer, an e-book reader, an MP3 (Moving Picture Experts Group Audio Layer III) player, an MP4 (Moving Picture Experts Group Audio Layer IV) player, a portable laptop computer, a desktop computer, and any other appropriate terminal devices.

Figure 5:
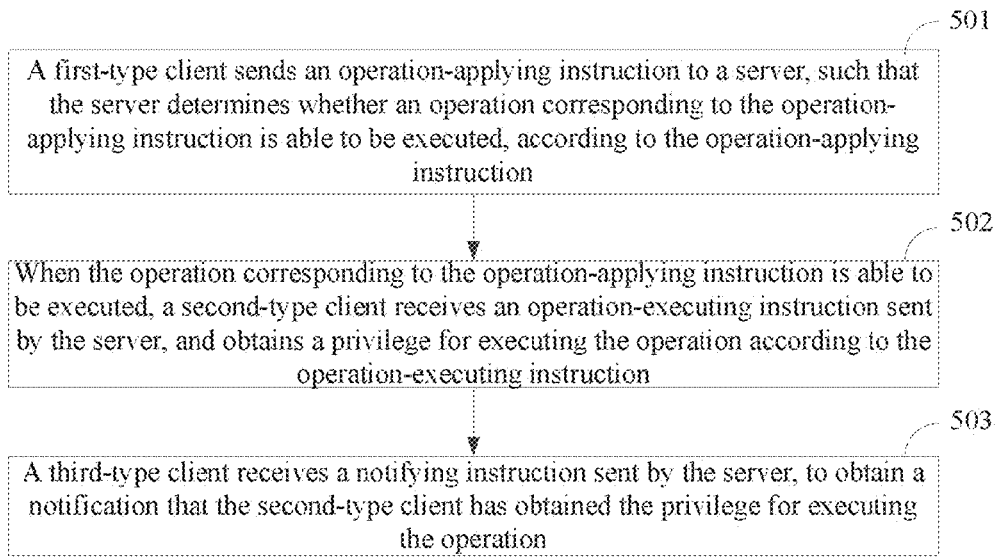
FIG. 5 depicts a flow diagram of another exemplary method for achieving privilege separation in accordance with various disclosed embodiments.

FIG. 5 depicts a flow diagram of another exemplary method for achieving privilege separation in accordance with various disclosed embodiments. Referring to FIG. 5, a method for achieving privilege separation can include the following exemplary step(s).

In Step 501, a first-type client sends an operation-applying instruction to a server, such that the server can determine whether an operation corresponding to the operation-applying instruction is able to be executed, according to the operation-applying instruction. In Step 502, when the operation corresponding to the operation-applying instruction is able to be executed, a second-type client receives an operation-executing instruction sent by the server, and obtains a privilege for executing the operation according to the operation-executing instruction. In Step 503, a third-type client receives a notifying instruction sent by the server, to obtain a notification that the second-type client has obtained the privilege for executing the operation.

In certain embodiments, the disclosed method can further include the following exemplary step(s). A client can send a room-entering request to the server. According to the room-entering request, the server can determine a corresponding client type. A client-type notification sent by the server can be received, to obtain the client type. The client type can include a first-type client, a second-type client, or a third-type client.

In certain embodiments, after the client sends the room-entering request to the server, the disclosed method can further include the following exemplary step(s). An entering-success message sent by the server can be received. A member-list-pulling request can be sent to the server. A member-list message sent by the server can be received. The member-list message can contain the client type(s) of all the clients in the room.

In other words, when a client applies for entering the voice room, the client can send a room-entering request to the server. By notification via broadcasting, the client type can be obtained by the client and/or other clients in the room. The client type can include, e.g., a first-type client (i.e., an administrator-user client), a second-type client (i.e., a specific-user client), or a third-type client (i.e., a general-user client).

In certain embodiments, the disclosed method can further include the following exemplary step(s). When the operation corresponding to the operation-applying instruction is not able to be executed, the first-type client can receive an application-failure notification sent by the server.

In certain embodiments, the operation-applying instruction can contain a second-type client identification and operation-type information. The operation-type information may include, e.g., broadcast-launching operation information, or broadcast-ending operation information.

For example, when an operation-applying instruction sent to the server by a first-type client contains broadcast-launching operation information, during the second-type client receiving an operation-executing instruction sent by server and obtaining a privilege for executing the operation according to the operation-executing instruction, the method can include the following step(s). That is, the second-type client can receive an instruction for executing a broadcast-launching operation sent by the server. The second-type client can then obtain a privilege for the broadcast-launching operation according to the instruction for executing the broadcast-launching operation.

When the received operation-applying instruction sent to the server by the first-type client contains broadcast-ending operation information, during the second-type client receiving an operation-executing instruction sent by server and obtaining a privilege for executing the operation according to the operation-executing instruction, the method can include the following step(s). That is, the second-type client can receive a broadcast-ending-operation notification sent by the server. Further, the second-type client can terminate the privilege for executing the operation.

Figure 6:
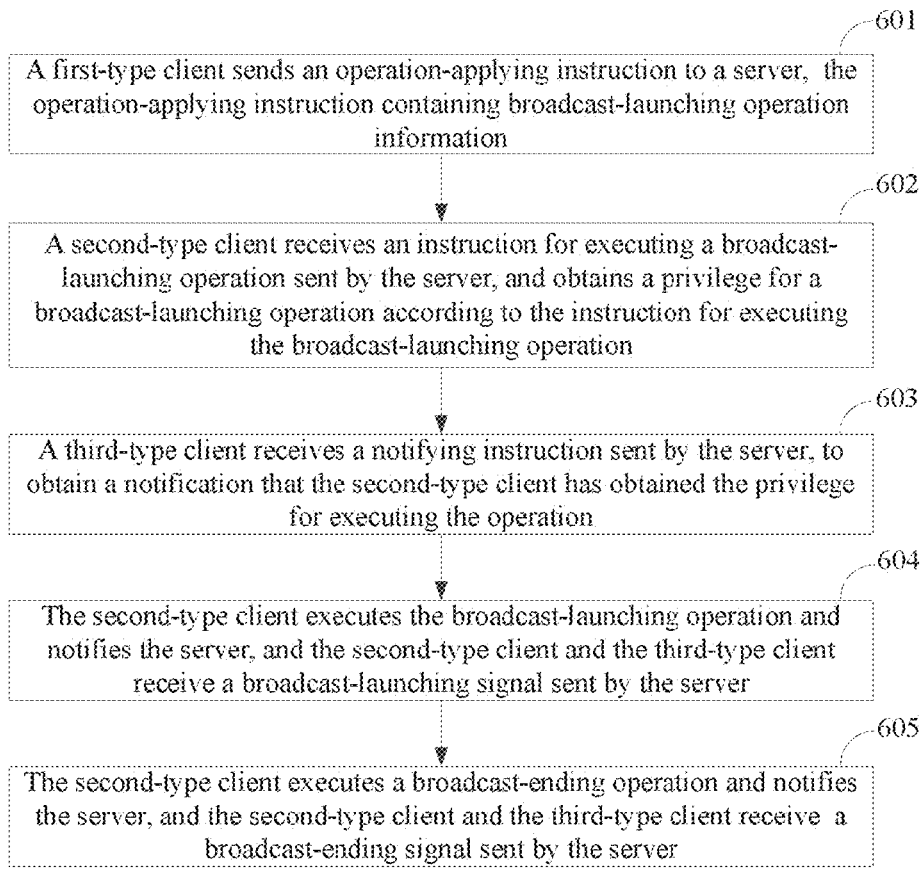
FIG. 6 depicts a flow diagram of another exemplary method for achieving privilege separation in accordance with various disclosed embodiments.

FIG. 6 depicts a flow diagram of another exemplary method for achieving privilege separation in accordance with various disclosed embodiments. Referring to FIG. 6, the method can include the following exemplary steps.

In Step 601, a first-type client sends an operation-applying instruction to a server. The operation-applying instruction contains broadcast-launching operation information.

In Step 602, a second-type client receives an instruction for executing a broadcast-launching operation sent by the server. The second-type client can then obtain a privilege for the broadcast-launching operation according to the instruction for executing the broadcast-launching operation.

In Step 603, a third-type client receives a notifying instruction sent by the server, to obtain a notification that the second-type client has obtained the privilege for executing the operation. In Step 604, the second-type client executes the broadcast-launching operation and notifies the server. The second-type client and the third-type client can receive a broadcast-launching signal sent by the server.

In Step 605, the second-type client executes a broadcast-ending operation and notifies the server. The second-type client and the third-type client can receive a broadcast-ending signal sent by the server.

In various embodiments described above, for illustrative purposes, a second-type client can obtain a privilege for a broadcast-launching operation. A process of the second-type client launching a broadcast (e.g., turning on a video) and ending a broadcast (e.g., turning off a video) is described. The second-type client can obtain merely the privilege for a broadcast-launching operation or a broadcast-ending operation, and does not have other privilege(s) that the administrator user has. Thus, the separating of a privilege for executing a specific operation from an administrator-user privilege can be achieved.

Figure 7:
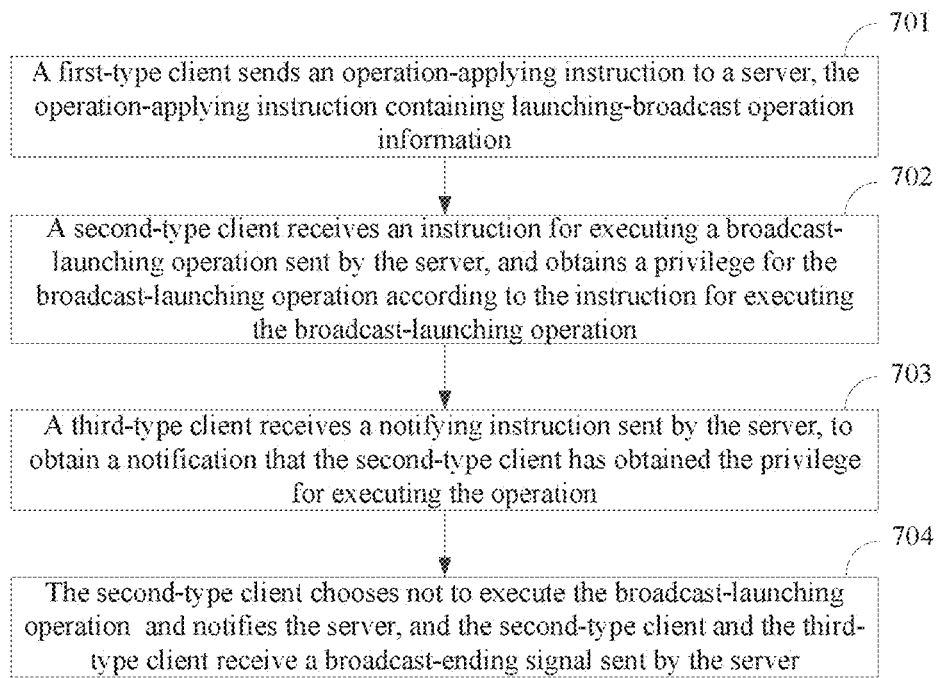
FIG. 7 depicts a flow diagram of another exemplary method for achieving privilege separation in accordance with various disclosed embodiments.

FIG. 7 depicts a flow diagram of another exemplary method for achieving privilege separation in accordance with various disclosed embodiments. Referring to FIG. 7, the method can include the following exemplary steps.

In Step 701, a first-type client sends an operation-applying instruction to a server. The operation-applying instruction contains broadcast-launching operation information.

In Step 702, a second-type client receives an instruction for executing a broadcast-launching operation sent by the server. The second-type client can obtain a privilege for the broadcast-launching operation according to the instruction for executing the broadcast-launching operation.

In Step 703, a third-type client receives a notifying instruction sent by the server, to obtain a notification that the second-type client has obtained the privilege for executing the operation. In Step 704, the second-type client chooses not to execute the broadcast-launching operation, and notifies the server accordingly. The second-type client and the third-type client can receive a broadcast-ending signal sent by the server.

In the example described above, for illustrative purposes, a second-type client can obtain a privilege for a broadcast-launching operation. The second-type client does not execute the broadcast-launching operation. Thus, the broadcast-launching operation can be cancelled.

Figure 8:
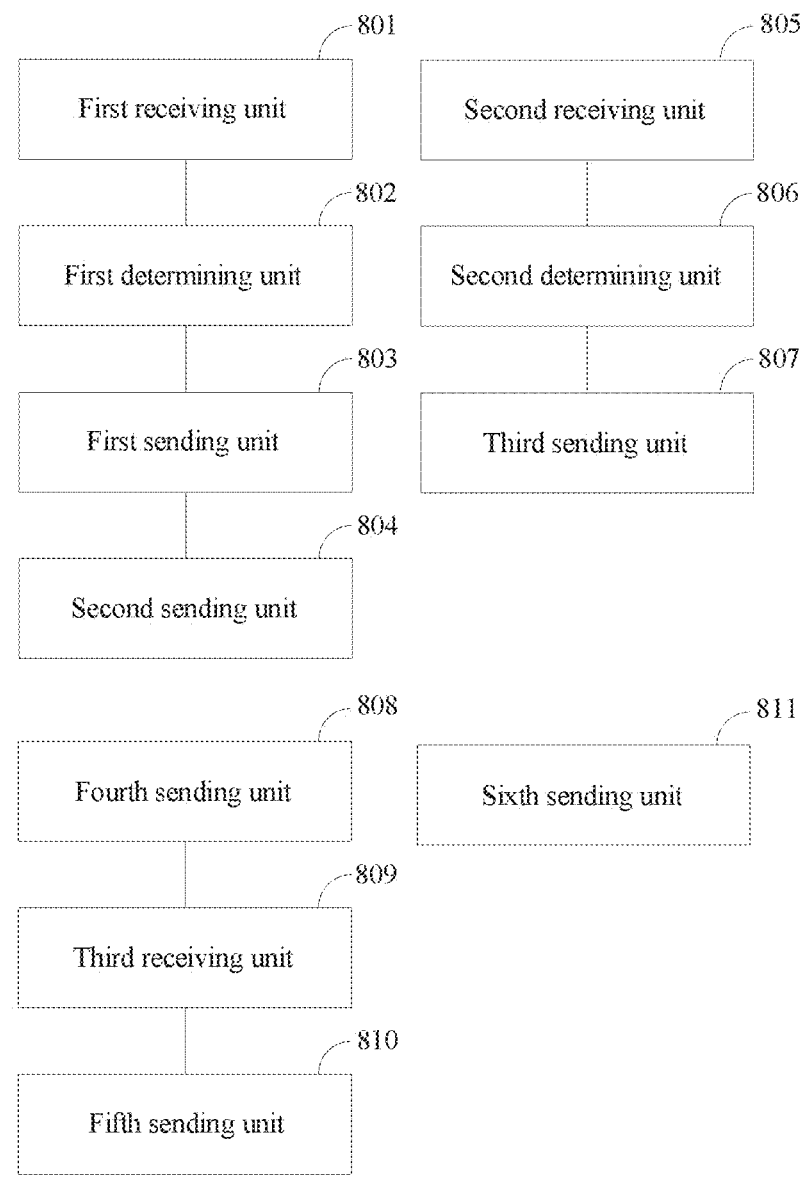
FIG. 8 depicts a structure diagram of an exemplary apparatus for achieving privilege separation in accordance with various disclosed embodiments.

Accordingly, various embodiments further provide an apparatus for achieving privilege separation. FIG. 8 depicts a structure diagram of an exemplary apparatus for achieving privilege separation in accordance with various disclosed embodiments. Referring to FIG. 8, the apparatus can include a first receiving unit 801, a first determining unit 802, a first sending unit 803, and a second sending unit 804. Certain units may be omitted and other units may be included.

The first receiving unit 801 is configured to receive an operation-applying instruction sent by a first-type client. The first determining unit 802 is configured to determine whether an operation corresponding to the operation-applying instruction is able to be executed, according to the operation-applying instruction.

The first sending unit 803 is configured to, when the operation corresponding to the operation-applying instruction is able to be executed, send an operation-executing instruction to the second-type client, such that the second-type client obtains a privilege for executing the operation according to the operation-executing instruction. The second sending unit 804 is configured to send a notifying instruction to a third-type client, such that the third-type client obtains a notification that the second-type client has obtained the privilege for executing the operation.

In certain embodiments, the apparatus for achieving privilege separation can further include a second receiving unit 805, a second determining unit 806, and a third sending unit 807. The second receiving unit 805 is configured to receive a room-entering request sent by a client.

The second determining unit 806 is configured to determine a client type corresponding to the client, according to the room-entering request. The third sending unit 807 is configured to send a client-type notification to all of the clients in the room, such that all of the clients in the room can obtain the client type of the client that sends the room-entering request. The client type can include a first-type client, a second-type client, or a third-type client.

In certain embodiments, the apparatus for achieving privilege separation can further include a fourth sending unit 808, a third receiving unit 809, and a fifth sending unit 810. The fourth sending unit 808 is configured to send an entering-success message to the client that sends the room-entering request. The third receiving unit 809 is configured to receive a member-list-pulling request sent by the client that sends the room-entering request. The fifth sending unit 810 is configured to send a member-list message to the client that sends the room-entering request. The member-list message can contain the client type(s) of all the clients in the room.

In certain embodiments, the apparatus for achieving privilege separation can further include a sixth sending unit 811. The sixth sending unit 811 is configured to, when the operation corresponding to the operation-applying instruction is not able to be executed, send an application-failure notification to the first-type client.

In certain embodiments, the operation-applying instruction can contain a second-type client identification and operation-type information. The operation-type information may include broadcast-launching operation information or broadcast-ending operation information.

For example, when the received operation-applying instruction contains broadcast-launching operation information, the first sending unit 803 is configured to send an instruction for executing a broadcast-launching operation to the second-type client, such that the second-type client can obtain a privilege for the broadcast-launching operation according to the instruction for executing the broadcast-launching operation.

When a received operation-applying instruction contains broadcast-ending operation information, the first sending unit 803 is configured to send a broadcast-ending-operation notification to the second-type client, and terminate the privilege of the second-type client for executing the operation.

In various embodiments, each of the first-type client, the second-type client and the third-type client can be loaded on a terminal. The server or the terminal can be referred to as a device for achieving privilege separation. Thus, various embodiments disclosed herein also provide a device for achieving privilege separation. The device can be a server, or a client, as described in various embodiments, e.g., as shown in FIGS. 1-8.

Figure 9:
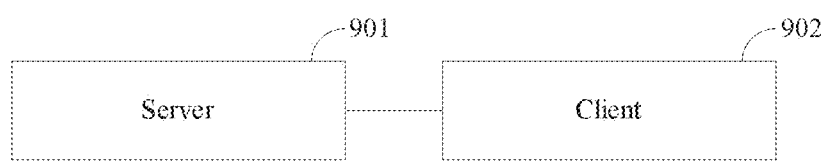
FIG. 9 depicts a structure diagram of an exemplary system for achieving privilege separation in accordance with various disclosed embodiments.

Accordingly, various embodiments further provide a system for achieving privilege separation. FIG. 9 depicts a structure diagram of an exemplary system for achieving privilege separation in accordance with various disclosed embodiments. Referring to FIG. 9, the system may include a server 901 and a client 902. The client 902 can be divided into a first-type client, a second-type client, and a third-type client. That is, the client 902 can be a first-type client, a second-type client, or a third-type client.

The server 901 and the client 902 may be coupled through a communication network for information exchange, such as information-sharing and interactions in a voice room or an audio-and-video live broadcast room, sending/receiving various instructions, etc. That is, the server 901 and the client 902 can be in a communication connection. Although only one client 902 and one server 901 are shown in FIG. 9, any number of clients 902 or servers 901 may be included, and other devices may also be included. Further, various clients 902 can communicate with each other via the communication network.

The communication network may include any appropriate type of communication network for providing network connections to the server 901 and client 902 or among multiple servers 901 or clients 902. For example, the communication network may include the Internet or other types of computer networks or telecommunication networks, either wired or wireless.

The server 901 is configured to receive an operation-applying instruction sent by the first-type client and determine whether an operation corresponding to the operation-applying instruction is able to be executed, according to the operation-applying instruction. When the operation corresponding to the operation-applying instruction is able to be executed, the server 901 can send an operation-executing instruction to the second-type client, such that the second-type client obtains a privilege for executing the operation according to the operation-executing instruction. The server 901 can further send a notifying instruction to the third-type client, such that the third-type client obtains a notification that the second-type client has obtained the privilege for executing the operation.

In certain embodiments, the server 901 is further configured to receive a room-entering request sent by a client, and determine a client type corresponding to the client according to the room-entering request. The server 901 can send a client-type notification to all of the clients in the room, such that all of the clients in the room can obtain the client type of the client that sends the room-entering request. The client type can include a first-type client, a second-type client, or a third-type client.

In certain embodiments, the server 901 is further configured to, after receiving the room-entering request sent by the client, send an entering-success message to the client that sends the room-entering request. The server 901 can receive a member-list-pulling request sent by the client that sends the room-entering request. The server 901 can send a member-list message to the client that sends the room-entering request. The member-list message can contain the client type(s) of all the clients in the room.

In certain embodiments, the server 901 is configured to, when the operation corresponding to the operation-applying instruction is not able to be executed, send an application-failure notification to the first-type client.

In certain embodiments, the operation-applying instruction can contain a second-type client identification and operation-type information. The operation-type information may include broadcast-launching operation information or broadcast-ending operation information.

When the received operation-applying instruction contains broadcast-launching operation information, the server 901 can send an operation-executing instruction to the second-type client, such that the second-type client obtains a privilege for executing the operation according to the operation-executing instruction. For example, the server 901 can send an instruction for executing a broadcast-launching operation to the second-type client, such that the second-type client can obtain a privilege for the broadcast-launching operation according to the instruction for executing the broadcast-launching operation.

When a received operation-applying instruction contains broadcast-ending operation information, the server 901 can send an operation-executing instruction to the second-type client, such that the second-type client obtains a privilege for executing the operation according to the operation-executing instruction. For example, the server 901 can send a broadcast-ending-operation notification to the second-type client, and terminate the privilege of the second-type client for executing the operation.

The first-type client is configured to send the operation-applying instruction to the server 901. The second-type client is configured to, when the operation corresponding to the operation-applying instruction is able to be executed, receive the operation-executing instruction sent by the server 901 and obtain a privilege for executing the operation according to the operation-executing instruction.

The third-type client is configured to receive the notifying instruction sent by the server 901, and obtain a notification that the second-type client has obtained the privilege for executing the operation.

In certain embodiments, the client is configured to send a room-entering request to the server 901, receive a client-type notification sent by the server 901, and obtain the client type of the client that sends the room-entering request. The client type can include a first-type client, a second-type client, or a third-type client.

In certain embodiments, the client is further configured to, after receiving the room-entering request sent by the client, receive an entering-success message sent by the server, send a member-list-pulling request to the server 901, and receive a member-list message sent by the server 901. The member-list message can contain the client type(s) of all the clients in the room.

In certain embodiments, the client is further configured to, when the operation corresponding to the operation-applying instruction is not able to be executed, receive an application-failure notification sent by the server 901.

In certain embodiments, the operation-applying instruction can contain a second-type client identification and operation-type information. The operation-type information may include broadcast-launching operation information or broadcast-ending operation information.

When the operation-applying instruction sent to the server 901 by the first-type client contains broadcast-launching operation information, the second-type client is configured to receive an instruction for executing a broadcast-launching operation sent by the server 901, to obtain a privilege for the broadcast-launching operation according to the instruction for executing the broadcast-launching operation.

When the operation-applying instruction sent to the server 901 by the first-type client contains broadcast-ending operation information, the second-type client is configured to receive a broadcast-ending-operation notification sent by the server 901, and terminate the privilege of the second-type client for executing the operation.

In various embodiments, a system for achieving privilege separation can implement the process as follows. The first-type client can send an operation-applying instruction to the server 901. The server can receive the operation-applying instruction sent by the first-type client, and determine whether an operation corresponding to the operation-applying instruction is able to be executed, according to the operation-applying instruction. When the operation corresponding to the operation-applying instruction is able to be executed, the server 901 can send an operation-executing instruction to the second-type client, and send a notifying instruction to the third-type client. The second-type client can receive the operation-executing instruction sent by the server 901 and obtain a privilege for executing the operation according to the operation-executing instruction. The third-type client can receive the notifying instruction sent by the server 901, to obtain a notification that the second-type client has obtained the privilege for executing the operation.

Figure 10:
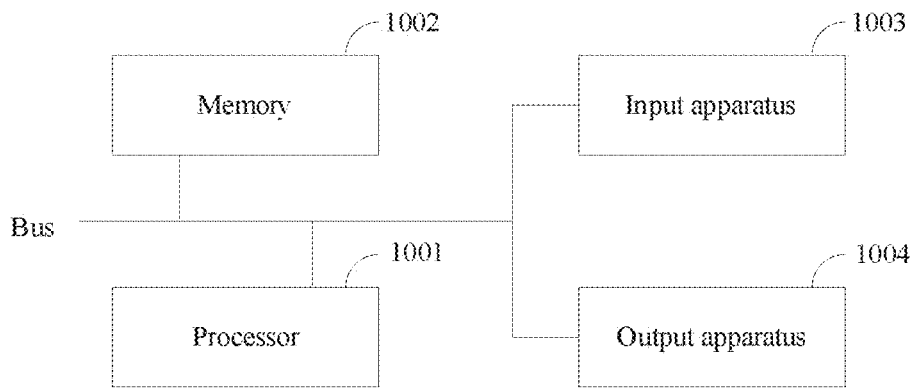
FIG. 10 depicts a structure diagram of an exemplary server in accordance with various disclosed embodiments.

Accordingly, various embodiments further provide a server. The server accomplishing the various disclosed functions can be referred to using any other appropriate terms. For example, the server can also be referred to as recommendation server, browser server, etc. FIG. 10 depicts a structure diagram of an exemplary server in accordance with various disclosed embodiments. As shown in FIG. 10, the server may include a processor 1001, a memory 1002, an input apparatus 1003 and an output apparatus 1004. Certain components may be omitted and other components may be included. Further, an exemplary client can have a structure similar to or the same as the structure depicted in FIG. 10. Certain components may be omitted and other components may be included.

The server can have one or more processors 1001. For illustrative purposes, as shown in FIG. 10, the server has one processor 1001. In certain embodiments, the processor 1001, the memory 1002, the input apparatus 1003 and the output apparatus 1004 can be connected via a bus or other means. For illustrative purposes, as shown in FIG. 10, the processor 1001, the memory 1002, the input apparatus 1003 and the output apparatus 1004 are connected via a bus.

Memory 1002 is configured to store software programs and software modules. By running the software programs and software modules stored on the memory 1002, the processor 1001 can implement various functional applications and data processing of the browser server.

The memory 1002 can contain a program-storage area and a data-storage area. The program-storage area can store the operating system, application programs required by at least one function, and any other appropriate programs. In addition, the memory 1002 can include, e.g., a high-speed random access memory (RAM), and/or a non-volatile memory. For example, the memory 1002 can include one or more of magnetic disk memory device, flash memory device, and other volatile solid-state memory devices. The input apparatus 1003 can be configured to receive inputted number or character information, and to generate signal input of keyboard, mouse, joystick, and trackball or optical signal input related to the user settings and function controls. The input apparatus 1003 can further include, e.g., an audio input device such as a microphone, and/or a touch control panel. The output apparatus 1004 can include any appropriate output components, e.g., an audio output device (such as a speaker, earplug jack and the like), and/or a display panel.

In one embodiment, the processor 1001 can load into the memory 1002 executable file(s) corresponding to process (es) of one or more application programs, according to certain instructions. Further, the processor 1001 can run the application programs stored in the memory 1002, in order to achieve various functions. The certain instructions can be as follows.

An operation-applying instruction sent by a first-type client can be received. According to the operation-applying instruction, it can be determined whether an operation corresponding to the operation-applying instruction is able to be executed. When the operation corresponding to the operation-applying instruction is able to be executed, an operation-executing instruction can be sent to the second-type client, such that the second-type client obtains a privilege for executing the operation according to the operation-executing instruction. A notifying instruction can be sent to a third-type client, such that the third-type client obtains a notification that the second-type client has obtained the privilege for executing the operation.

Accordingly, the instruction can further include the following. A room-entering request sent by a client can be received. According to the room-entering request, a client type corresponding to the client can be determined. A client-type notification can be sent to all clients in the room, such that all clients in the room can obtain the client type of the client that sends the room-entering request. The client type can include a first-type client, a second-type client, or a third-type client.

Accordingly, the instruction can further include the following. An entering-success message can be sent to the client that sends the room-entering request. A member-list-pulling request sent by the client that sends the room-entering request can be received. A member-list message can be sent to the client that sends the room-entering request. The member-list message can contain the client type of all the clients in the room.

Accordingly, the instruction can further include the following. When the operation corresponding to the operation-applying instruction cannot be executed, an application-failure notification can be sent to the first-type client.

Accordingly, the instruction can further include the following. The operation-applying instruction can contain a second-type client identification and operation-type information. The operation-type information may include broadcast-launching operation information or broadcast-ending operation information.

When the received operation-applying instruction contains broadcast-launching operation information, an operation-executing instruction can be sent to the second-type client, such that the second-type client obtains a privilege for executing the operation according to the operation-executing instruction. For example, an instruction for executing a broadcast-launching operation can be sent to the second-type client, such that the second-type client can obtain a privilege for the broadcast-launching operation according to the instruction for executing the broadcast-launching operation.

When a received operation-applying instruction contains broadcast-ending operation information, an operation-executing instruction can be sent to the second-type client, such that the second-type client obtains a privilege for executing the operation according to the operation-executing instruction. For example, a broadcast-ending-operation notification can be sent to the second-type client, and the privilege of the second-type client for executing the operation can be terminated.

Thus, in the method according to various embodiments, a first-type client, i.e., an administrator-user client, can send an operation-applying instruction to a server, such that the server can send an operation-executing instruction to a second-type client, i.e., a specific-user client. Thus, the second-type client can obtain a privilege for executing an operation, e.g., a privilege for a broadcast-launching operation. In the process as disclosed above, only the privilege for executing the specific operation is granted to a specific user, while the administrator-user privilege is not transferred. Thus, security of an audio-and-video live broadcast room can be ensured.

In certain embodiments, the disclosed methods can be used for real-time voice communication platform. For example, QT Voice is a multi-player real-time voice communication software program developed by Tencent Holdings Limited, located in Shenzhen, China. QT Voice can provide a QT platform, and via the QT platform, users can directly turn on a QT Voice client to perform voice communication. A QT Voice client can refer to a client installed with QT Voice.

QT Voice can be used in various modes. One of the various modes is an entertainment mode. In the entertainment mode, an artist certified by QT platform can provide entertainment contents and interact with audience in an audio-and-video live broadcast room.

An administrator, also referred to as an administrator user, is an identity or status that has a privilege for administrative operations in an audio-and-video live broadcast room. An artist is an identity or status that is audited and certified by QT platform to provide entertainment contents.

Figure 11A:
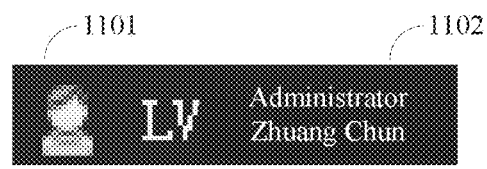
FIGS. 11A-11B depict icons for various clients in accordance with various disclosed embodiments.
Figure 11B:
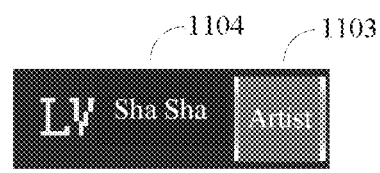

In order to effectively identify an administrator and an artist, various icons can be assigned in a member list to identify identities. The member list can be similar to or the same as the member-list message as described above in various embodiments. That is, various icons can be used for identifying various client types in the member-list message. For example, FIGS. 11A-11B depict icons for various clients in accordance with various disclosed embodiments. As shown in FIG. 11A, for an administrator, an administrator icon 1101 can be added before the name 1102 of the administrator. That is, the administrator icon 1101 can be displayed on an appropriate interface during communication in the audio-and-video live broadcast room, e.g., can be displayed on an interface displaying the member list or the member-list message. As shown in FIG. 11B, for an artist, an artist icon 1103 can be added after the name 1104 of the artist. That is, the artist icon 1103 can be displayed on an appropriate interface during communication in the audio-and-video live broadcast room, e.g., can be displayed on an interface displaying the member list or the member-list message.

In one embodiment, the administrator can choose to carry any one of the artists onto the stage, via the member list. For example, the selecting of an artist can be operated using a member tree. First, based on icons, the administrator can identify members having an artist identity (i.e., artists) from a crowd of members. Next, the administrator can carry one or more of the artists onto the stage, e.g., by right-key operation using a mouse. By carrying the artist onto the stage, the administrator successfully grants the artist a privilege for launching a broadcast. After the artist gets on the stage, only the artist certified by the QT platform (e.g., selected by the administrator) can have a privilege for launching a broadcast. Other clients or members cannot launch a broadcast or output contents. During the performing of the artist, the artist can end the performing by himself/herself, or alternatively, the artist can be carried off the stage by the administrator in order to end the performing of the artist.

Figure 12A:
FIGS. 12A-12D depict interfaces for carrying an artist onto a stage in accordance with various disclosed embodiments.
Figure 12B:
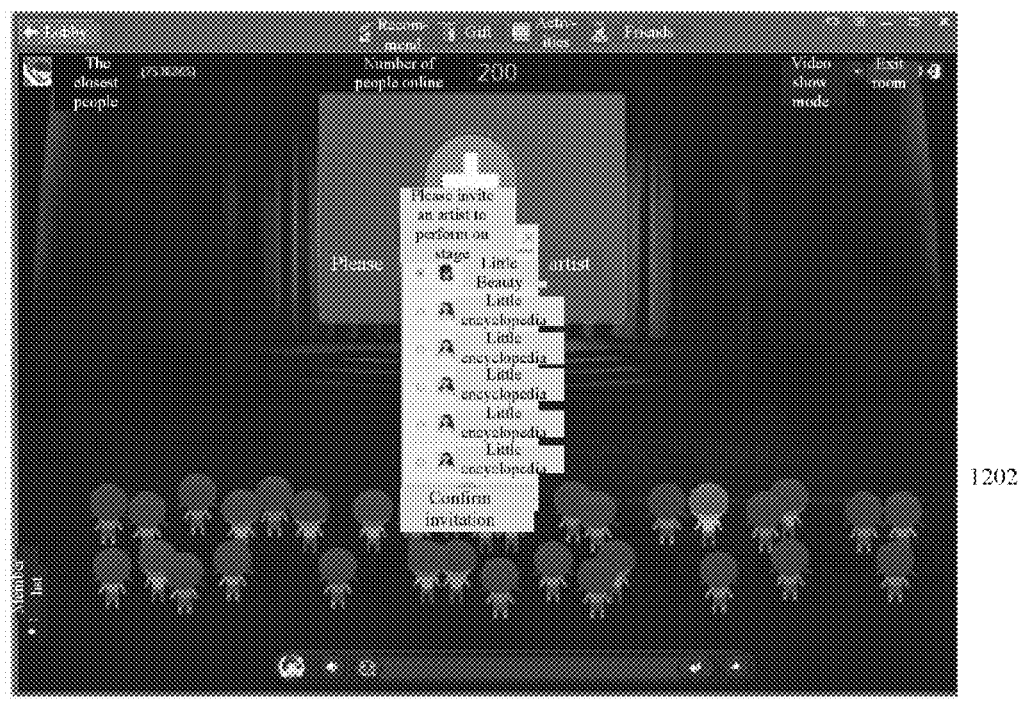
Figure 12C:
Figure 12D:
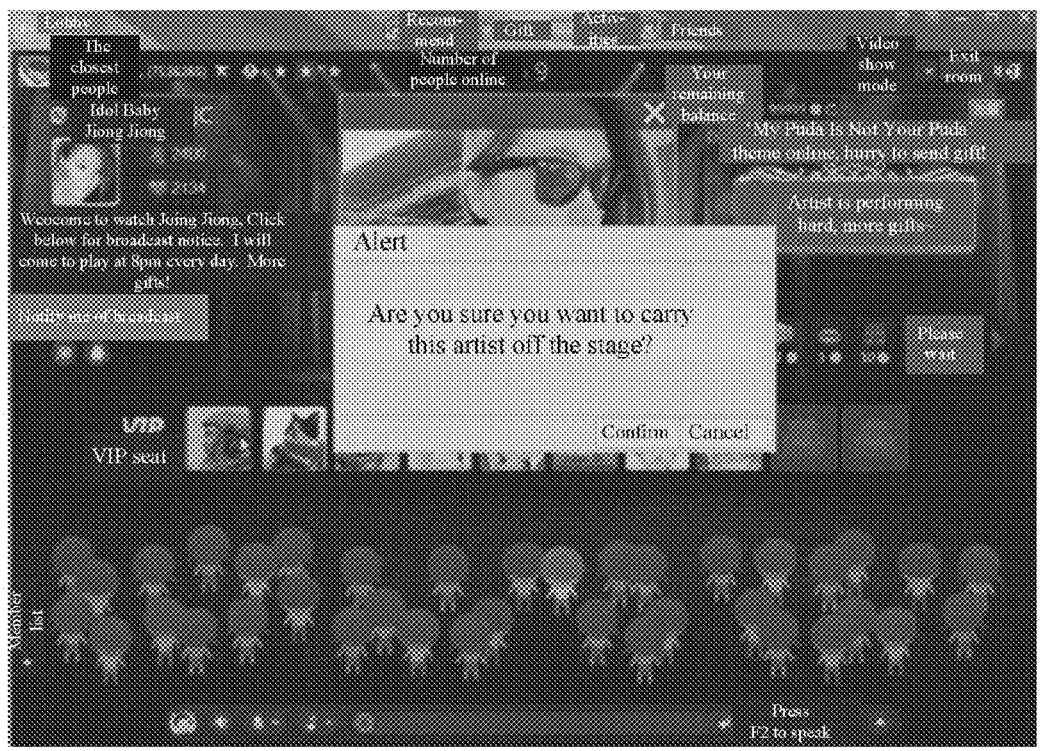

In another embodiment, the administrator can select an artist to perform on stage, via a video area (on the interface of QT software displayed to the administrator). For example, FIGS. 12A-12D depict interfaces for carrying an artist onto a stage in accordance with various disclosed embodiments. The interfaces can be displayed on the terminal that implements the first-type client, i.e., the administrator-user client or the administrator. An adding icon 1201 can be clicked on for selecting artists, as shown in FIG. 12A. After the administrator clicks on the adding icon 1201, an artist list can be displayed. After one or more of the artists are selected, an invitation-confirming button 1202 can be clicked on, in order to confirm to select and invite the artist(s), as shown in FIG. 12B. An interface can be displayed, to indicate that an invitation has been sent to the artist. The artist is preparing for the performance (e.g., sharing a video), and the performing is to be started, as shown in FIG. 12C. After the administrator desires to end the performing of the artist, the administrator can terminate the privilege for launching a broadcast for the artist via any appropriate operations. Optionally, a confirmation dialog box can display a prompt message for confirmation, as shown in FIG. 12D.

Thus, privilege can be effectively separated. The administrator identity can be granted by a room owner. The artist identity can be granted after the auditing and authentication by the QT platform. After separating the privilege, the administrator, as the order-maintainer and operator of the room, no longer has to transfer his/her own privilege to the artist. Thus, various errors and trouble, which are caused by an artist assuming an administrator identity, can be avoided. In addition, the artist can have a unified artist identity on the QT platform, such that the artist can perform in any room on the QT platform. Thus, activity of the platform can be improved, and growth speed of the artist can be improved.

For a room, the false operations performed by temporarily granting administrator privileges to an artist can be substantially completely eliminated. The impact of privilege issues on the room and audience can be minimized. For an artist, the artist identity on the platform can be a recognition and an honor. For the room and the audience, the artist identity can be an assurance of quality. At the same time, the barrier problem for artists to perform in different rooms can be substantially fully solved.

It should be noted that, in various embodiments, the apparatus for achieving privilege separation or the system for achieving privilege separation can correspond to the method for achieving privilege separation. Further features of the apparatus for achieving privilege separation or the system for achieving privilege separation can be similar to or the same as the features described in the method for achieving privilege separation.

It should be noted that, as used herein, relational terms such as 'first' and 'second' are merely used for differentiate one entity or operation from another entity or operation, and do not require or imply that any actual relationship or order as such exist between these entities or operations. In addition, the terms "include", "comprise", "comprise", or any other variations thereof, are intended to cover a non-exclusive inclusion, such that a process, method, article, or apparatus that includes a series of elements can not only include those elements, but also include other elements not expressly listed, or inherent elements for such a process, method, article, or apparatus. Without further limitation, an element defined by a statement "include one" does not exclude additional identical elements that may be included in the process, method, article, or apparatus that includes the element.

Part or all of the steps in the methods or algorithms in accordance with various embodiments can be implemented directly using hardware, software modules executed by a processor, or a combination thereof (i.e., a program/software to instruct related hardware). The software modules can be stored in a (non-transitory) computer-readable storage medium including, e.g., Read-Only Memory (ROM), RAM, internal memory, electrically-programmable ROM, electrically-erasable-programmable ROM, register, hard disk, removable disk, CD-ROM, or any other appropriate storage medium.

The embodiments disclosed herein are exemplary only. Other applications, advantages, alternations, modifications, or equivalents to the disclosed embodiments are obvious to those skilled in the art and are intended to be encompassed within the scope of the present disclosure.

Industrial Applicability and Advantageous Effects

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

The disclosed methods, apparatus, devices, and systems for achieving privilege separation can be used in a variety of Internet applications that involve conferencing technology. The Internet applications can include, but are not limited to, information-sharing, real-time online chat and online interaction between users, audio or video sharing, presentation, and any other appropriate interactions. Such interactions can use a voice room, chat room, audio-and-video live broadcast room, etc.

Using the methods in accordance with various embodiments, an operation-applying instruction sent by a first-type client can be received. The first-type client can be an administrator-user client. The first-type client can request a specific operation. The first-type client can send an operation-applying instruction in order to request the specific operation. When the operation is able to be executed, the server can send an operation-executing instruction to a second-type client. The second-type client can be a specific-user client. Thus, the specific-user client can obtain a privilege for executing the operation, e.g., a privilege for launching a live broadcast. The server can send to other clients, including a third-type client, a notification that the second-type client has obtained the privilege for executing the operation. Thus, the separating of a privilege for executing a specific operation from an administrator privilege can be achieved. The administrator privilege does not need to be transferred to another user. Security of an audio-and-video live broadcast room can be ensured.

When the operation corresponding to the operation-applying instruction is not able to be executed, an application-failure notification can be sent to the first-type client. For example, the operation corresponding to the operation-applying instruction is being performed by another user at the current time, and in this case, the first-type client can be notified that the application has failed. In addition, the first-type client can be notified of reason(s) of the application failure.

The method can further include a process of a client entering a room and obtaining client types. Clients can be divided into a first-type client, a second-type client, a third-type client, such that a privilege for a specific operation can be separated.

The disclosed method can be implemented in an audio-and-video live broadcast room. A first-type client, i.e., an administrator-user client, can send an operation-applying instruction containing broadcast-launching operation information, or broadcast-ending operation information. Thus, a second-type client, i.e., a specific-user client, can obtain a privilege for a broadcast-launching operation or terminate the privilege for the broadcast-launching operation. Thus, the separating of a privilege for executing a specific operation from an administrator-user privilege can be achieved. When a specific user needs to launch a broadcast, the administrator user does not need to transfer his/her own administrator-user privilege to another user (i.e., the specific user). By simply sending the operation-applying instruction to the server, the specific user can obtain the privilege for the broadcast-launching operation. Thus, security of an audio-and-video live broadcast room can be ensured.

What is claimed is:

1. A method for achieving privilege separation for a virtual room, comprising:
   receiving an operation-applying instruction sent by a first-type client;
   according to the operation-applying instruction, determining whether an operation corresponding to the operation-applying instruction is able to be executed, wherein the first-type client has administrative privileges of the virtual room including a privilege for executing the operation;
   when the operation corresponding to the operation-applying instruction is able to be executed, sending an operation-executing instruction to a second-type client, such that the second-type client obtains the privilege for executing the operation, according to the operation-executing instruction, wherein the second-type client is selected to receive from the first-type client the privilege for executing the operation without receiving all the administrative privileges;
   sending a notifying instruction to a third-type client without any of the administrative privileges, such that the third-type client obtains a notification that the second-type client has obtained the privilege for executing the operation;
   receiving a room-entering request sent by a client;
   according to the room-entering request, determining a client type corresponding to the client; and
   sending a client-type notification to all of clients in a room, such that the all of the clients in the room obtain the client type of the client that sends the room-entering request, wherein the client type includes the first-type client, the second-type client, or the third-type client.

2. The method according to 1, wherein, after receiving the room-entering request sent by the client, the method further comprises:
   sending an entering-success message to the client that sends the room-entering request;
   receiving a member-list-pulling request sent by the client that sends the room-entering request; and
   sending a member-list message to the client that sends the room-entering request, the member-list message containing a client type of the all of the clients in the room.

3. The method according to claim 1, further comprising:
   when the operation corresponding to the operation-applying instruction is not able to be executed, sending an application-failure notification to the first-type client.

4. The method according to claim 1, wherein:
   the operation-applying instruction contains a second-type client identification and operation-type information, the operation-type information including broadcast-launching operation information or broadcast-ending operation information;
   when the received operation-applying instruction includes the broadcast-launching operation information, the sending of the operation-executing instruction to the second-type client comprises:
      sending an instruction for executing a broadcast-launching operation to the second-type client, such that the second-type client obtains the privilege for the broadcast-launching operation according to the instruction for executing the broadcast-launching operation; and when the received operation-applying instruction includes the broadcast-ending operation information, the sending of the operation-executing instruction to the second-type client comprises:
sending a broadcast-ending-operation notification to the second-type client, and terminating the privilege of the second-type client for executing the operation.

5. A method for achieving privilege separation for a virtual room, comprising:
sending, by a first-type client, an operation-applying instruction to a server, to cause the server to determine whether an operation corresponding to the operation-applying instruction is able to be executed according to the operation-applying instruction, wherein the first-type client has administrative privileges of the virtual room including a privilege for executing the operation;
when the operation corresponding to the operation-applying instruction is able to be executed, receiving, by a second-type client, an operation-executing instruction sent by the server, and obtaining, by the second-type client, the privilege for executing the operation according to the operation-executing instruction, wherein the second-type client is selected to receive from the first-type client the privilege for executing the operation without receiving all the administrative privileges;
receiving, by a third-type client without any of the administrative privileges, a notifying instruction sent by the server, and obtaining, by the third-type client, a notification that the second-type client has obtained the privilege for executing the operation;
sending, by a client, a room-entering request to the server, to cause the server to determine a client type corresponding to the client according to the room-entering request; and
receiving, by all of clients in a room, a client-type notification sent by the server, to obtain the client type of the client that sends the room-entering request, wherein the client type includes the first-type client, the second-type client, or the third-type client.

6. The method according to claim 5, wherein, after sending the room-entering request to the server, the method further comprises:
receiving, by the client, an entering-success message sent by the server;
sending, by the client, a member-list-pulling request to the server; and
receiving, by the client, a member-list message sent by the server, the member-list message containing a client type of the all of the clients in the room.

7. The method according to claim 5, further comprising:
when the operation corresponding to the operation-applying instruction is not able to be executed, receiving, by the first-type client, an application-failure notification sent by the server.

8. The method according to claim 5, wherein:
the operation-applying instruction contains a second-type client identification and operation-type information, the operation-type information including broadcast-launching operation information or broadcast-ending operation information;
when the operation-applying instruction sent to the server by the first-type client includes the broadcast-launching operation information, the receiving of the operation-executing instruction sent by the server, and the obtaining of the privilege for executing the operation according to the operation-executing instruction by the second-type client comprises:
receiving, by the second-type client, an instruction for executing a broadcast-launching operation sent by the server, to obtain the privilege for the broadcast-launching operation according to the instruction for executing the broadcast-launching operation; and
when the operation-applying instruction sent to the server by the first-type client includes the broadcast-ending operation information, the receiving of the operation-executing instruction sent by the server, and the obtaining of the privilege for executing the operation according to the operation-executing instruction by the second-type client comprises:
receiving, by the second-type client, a broadcast-ending-operation notification sent by the server, and terminating the privilege of the second-type client for executing the operation.

9. A non-transitory computer-readable storage medium containing computer-executable instructions for, when executed by a processor, performing a method for achieving privilege separation for a virtual room, the method comprising:
receiving an operation-applying instruction sent by a first-type client;
according to the operation-applying instruction, determining whether an operation corresponding to the operation-applying instruction is able to be executed, wherein the first-type client has administrative privileges of the virtual room including a privilege for executing the operation;
when the operation corresponding to the operation-applying instruction is able to be executed, sending an operation-executing instruction to a second-type client, such that the second-type client obtains the privilege for executing the operation, according to the operation-executing instruction, wherein the second-type client is selected to receive from the first-type client the privilege for executing the operation without receiving all the administrative privileges;
sending a notifying instruction to a third-type client without any of the administrative privileges, such that the third-type client obtains a notification that the second-type client has obtained the privilege for executing the operation;
receiving a room-entering request sent by a client;
according to the room-entering request, determining a client type corresponding to the client; and
sending a client-type notification to all of clients in a room, such that the all of the clients in the room obtain the client type of the client that sends the room-entering request, wherein the client type includes the first-type client, the second-type client, or the third-type client.

10. The non-transitory computer-readable storage medium according to claim 9, wherein, after receiving the room-entering request sent by the client, the method further comprises:
sending an entering-success message to the client that sends the room-entering request;
receiving a member-list-pulling request sent by the client that sends the room-entering request; and
sending a member-list message to the client that sends the room-entering request, the member-list message containing a client type of the all of the clients in the room.

11. The non-transitory computer-readable storage medium according to claim 9, the method further comprising:

when the operation corresponding to the operation-applying instruction is not able to be executed, sending an application-failure notification to the first-type client.

12. The non-transitory computer-readable storage medium according to claim 9, wherein:

the operation-applying instruction contains a second-type client identification and operation-type information, the operation-type information including broadcast-launching operation information or broadcast-ending operation information;

when the received operation-applying instruction includes the broadcast-launching operation information, the sending of the operation-executing instruction to the second-type client comprises:

sending an instruction for executing a broadcast-launching operation to the second-type client, such that the second-type client obtains the privilege for the broadcast-launching operation according to the instruction for executing the broadcast-launching operation; and when the received operation-applying instruction includes the broadcast-ending operation information, the sending of the operation-executing instruction to the second-type client comprises:

sending a broadcast-ending-operation notification to the second-type client, and terminating the privilege of the second-type client for executing the operation.

\* \* \* \* \*